United States Patent [19]

Piret et al.

[11] 3,851,547

[45] Dec. 3, 1974

[54] HYDRAULIC CIRCUITS FOR CONTROLLING AUTOMATIC GEAR BOXES

[75] Inventors: Jean Piret, Bougival; Philippe Quemerais, Villepreux, both of France

[73] Assignees: Regie Nationale des Usines Renault, Billancourt; Ste Automobiles Peugeot, Paris, both of, France

[22] Filed: Apr. 13, 1973

[21] Appl. No.: 350,730

[30] Foreign Application Priority Data

July 19, 1972 France .............................. 72.26043

[52] U.S. Cl........... 74/869, 74/752 C, 74/DIG. .001
[51] Int. Cl............................................ B60k 21/00
[58] Field of Search...... 74/752 C, 752 A, 863, 864, 74/868, 869, DIG. .001

[56] References Cited
UNITED STATES PATENTS 3,643,527   2/1972   Ohnuma .............................. 74/868
3,699,994   10/1972  Mohri ................................ 74/863 X

*Primary Examiner*—Samuel Scott
*Assistant Examiner*—F. D. Shoemaker
*Attorney, Agent, or Firm*—Clelle W. Upchurch

[57] ABSTRACT

A hydraulic circuit for controlling an automatic gear box comprises an output regulation valve controlled by a hydraulic distributor and a pressure regulation valve. The output regulation valve is connected to means for controlling clutch and brake devices of the gear box, and the pressure regulation valve is controlled by a pilot valve actuated in dependence upon the speed of an engine driving the gear box. The pressure regulation valve provides a path between the outlet of a pump, which feeds fluid to the circuit, and a fluid reservoir, the path being connected by a duct to the hydraulic distributor and to the output regulating valve. A pressure drop is provided across the outlet path, for example by a calibrated orifice whereby the hydraulic distributor and the output regulation valve are controlled in response to the speed of the engine.

4 Claims, 2 Drawing Figures

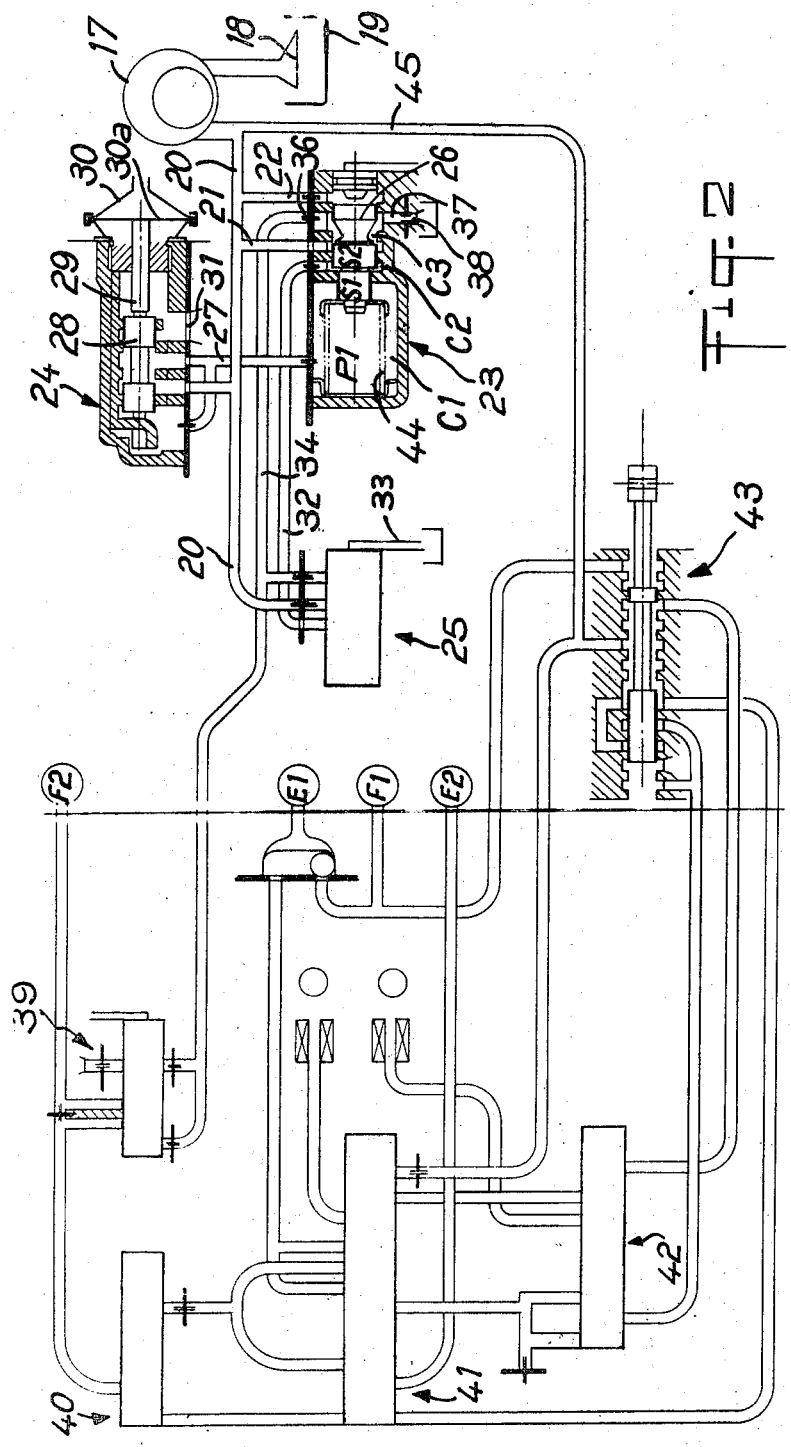

HYDRAULIC CIRCUITS FOR CONTROLLING AUTOMATIC GEAR BOXES

BACKGROUND OF THE INVENTION

1. Field of the Invention

The present invention relates to hydraulic circuits for controlling automatic gear boxes.

2. Description of the Prior Art

There has been proposed an automatic gear box for a vehicle comprising at least one planetary gear train in which it is possible to establish between an input shaft and an output shaft a transmission ratio which is determined in accordance with various parameters such as the load on the engine and the speed of the vehicle. The engagement of the appropriate ratio is effected by means of brakes and clutches which are selectively actuated by a hydraulic control circuit.

In such a circuit the line pressure of the fluid supplied to the brakes and clutches is regulated by a pressure regulation valve. To enable the gear box to be installed in a vehicle of comparatively small size and power it is necessary for the size of the gear box to be reduced; such reduction in size leads to a reduction in the size of the clutches and brakes and consequently to an increase in their line pressure in order to enable adequate control forces to be obtained and to permit transmission of the rated torque. This increase in pressure results in an increased power loss which can reach a very considerable percentage of the power of the engine, and this is a disadvantage more particularly in the case of comparatively small cylinder capacities.

SUMMARY OF THE INVENTION

According to the present invention, there is provided in a hydraulic circuit for controlling an automatic gear box in which selection of the drive ratio is effected by selective actuation of clutch means and brake means, hydraulic control means associated with the clutch means and the brake means, an output regulation valve, said valve being connected to the control means, a hydraulic distributor, a pressure regulation valve, the hydraulic distributor and the pressure regulation valve being operative to control the output regulation valve, a pilot valve responsive to the speed of an engine driving the gear box and operative to control the pressure regulation valve, a reservoir for hydraulic fluid, pump means operative to feed fluid from the reservoir, said pump means having an outlet, the pressure regulation valve defining an outlet path from the pump outlet to the reservoir, duct means connecting the output path to the hydraulic distributor and to the output regulating valve, and means operative to create a pressure drop in the said outlet path such that the hydraulic distributor and the output regulating valve are controlled in response to the speed of the engine.

BRIEF DESCRIPTION OF THE DRAWINGS

An embodiment of the invention will now be described, by way of example only, with reference to the accompanying diagrammatic drawings, in which:

FIG. 2 shows a hydraulic control circuit for a gear box of the transmission system shown in FIG. 1.

DESCRIPTION OF THE PREFERRED EMBODIMENT

Figure 1:
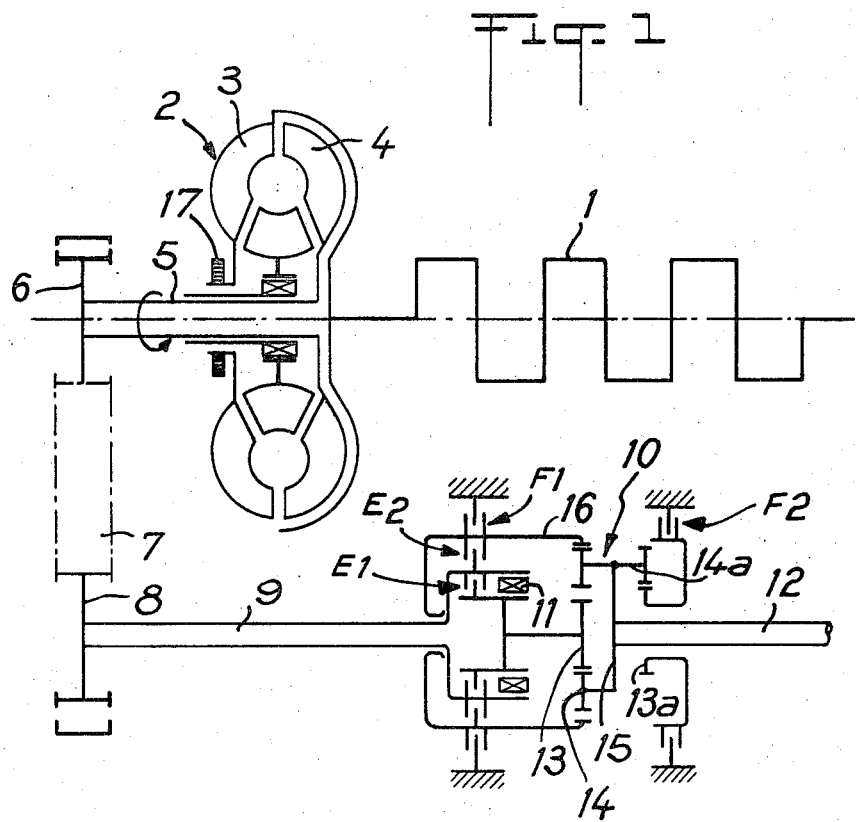
FIG. 1 schematically illustrates an automatic transmission system of a vehicle.

As shown in FIG. 1 an engine and drive unit for an automobile comprises an internal-combustion engine of which only the crankshaft 1 is indicated; the crankshaft is connected to the input member of a fluid torque converter 2 of which the turbine or output member 4 is rigid with a shaft 5 carrying a sprocket 6 or other gear wheel. The sprocket 6 is connected by a driving member 7, for example a chain, to a sprocket 8 mounted on the input shaft 9 of an epicyclic gear box 10. The gear box 10 comprises a planetary gear train, and clutch devices $E_1$ and $E_2$, brake or immobilizing devices $F_1$ and $F_2$ and a free wheel unit 11, which enable three forward speed ratios and one reverse speed to be obtained at an output shaft 12 of the gear box.

The planetary gear train comprises two sun gears 13 and 13a and two sets of planet gears 14 and 14a of different diameters, mounted on a planet carrier 15. The planetary gear train also comprises an annular gear 16 meshing with the planet gears 14a.

FIG. 2 shows a hydraulic control circuit for operating the clutch devices $E_1$ and $E_2$ and the immobilizing devices $F_1$ and $F_2$ of the gear box. The hydraulic circuit comprises a volumetric pump 17, for example a gear pump, which is driven by the engine to draw hydraulic fluid through a filter 18 from a fluid reservoir 19 and to deliver the fluid under pressure into a duct 20 connected by two branch ducts 21 and 22 to a pressure regulation valve 23. The pump 17 is also connected through the duct 20 to a pilot valve 24 and a hydraulic distributor 25.

The pressure regulation valve 23 comprises three chambers $C_1$, $C_2$ and $C_3$ and a spool or slide 26 mounted within the chambers; the slide 26 is subjected to the action of a spring 44. The chamber $C_1$ is connected by a duct 27 to the pilot valve 24 which comprises a spool or slide 28 connected by a rod 29 to a diaphragm 30a of a manometric capsule 30; the capsule 30 is operative to displace the slide 28 under the action of a force proportional to the value of the vacuum in the inlet manifold of the engine. The slide 28 is capable of placing the duct 27 selectively in communication with the duct 20 and with a duct 31 which leads to the reservoir 19 so as to produce a pilot pressure(P1) which is transmitted to the chamber $C_1$.

The chamber $C_2$ of the regulating valve 23 communicates through a duct 32 with the distributor 25 which comprises a slide capable of placing the chamber $C_2$ selectively in communication with the delivery duct 20 of the pump and with a duct 33 which leads back to the reservoir 19 whereby the chamber $C_2$ is not pressurized. The slide of the distributor 25 is actuated by the pressure of fluid in a duct 34 which leads into a chamber of the distributor 25 and communicates with the chamber $C_3$ of the valve 23 through an orifice 36.

The chamber $C_3$ is arranged in a fluid path between the pump and a duct 37 leading back to the reservoir 19; the duct 37 has a calibrated orifice 38 creating a pressure drop.

The duct 34 is also connected to an output regulation valve 39 associated in a manner known per se with a shut-off valve 40, two electro-hydraulic valves 41 and 42 and a manually-operated valve 43, which control hydraulic receivers $E_1$, $E_2$, $F_1$ and $F_2$ comprising friction elements adapted to receive a torque which increases with increasing hydraulic pressure.

The hydraulic receivers are arranged to operate the corresponding clutch and immobilizing devices of the gear box shown in FIG. 1.

The control circuit operates in the following manner:

The pressure drop created by the orifice 38 makes it possible to obtain a hydraulic pressure in the fluid path provided between the ducts 21 and 34 by the valve 23 in order to provide a pressure for controlling the various hydraulic receivers $E_1$, $E_2$, $F_1$ and $F_2$, the latter pressure being dependent on the speed of rotation of the engine.

The pressure (P) of the hydraulic fluid delivered by the pump 17 prevails in the feed ducts 21 and 22, and in the duct 32 when the slide of the distributor 25 is in the appropriate position, whereas the pilot valve 24 establishes a pressure P1 in the chamber $C_1$ of the regulation valve 23. According to the position of the slide of the distributor 25 as hereinbefore described, the pressure P also prevails in the chamber $C_2$ which is connected to the duct 20 via the duct 32.

The forces acting on the slide 26 of the regulation valve 23 are:

$$P1.S1 + R + P'(S2 - S1) = P.S2$$

in which S1 and S2 designate the effective areas of the faces of the slide 26 in the chambers C1 and C2, R the force of the spring 44, and P' the pressure in the chamber $C_2$.

The following relationships are deduced from this:
a. $P = P1 + R/S1$ if the pressure P is established in the chamber $C_2$.
b. $P' = P1.S1/S2 + R/S2$ if the pressure P is not established in the chamber $C_2$.

During the change of transmission ratio, the output (q) feeding the valve 43 depends solely on the delivery pressure P of the pump 17 to which the valve 43 is connected by a duct 45 forming a branch in parallel with the duct 20. This output q is deducted from the total output (Q) of the pump which is proportional to the speed of the engine.

In the ducts 20 and 21 an output $(Q - q)$ is therefore established which is also dependent on the speed of the engine. The chamber $C_3$ into which the duct 21 leads communicates with the reservoir 19 via the orifice 38, and consequently the output through that orifice also depends on the speed of the engine.

The pressure in chamber $C_3$ is consequently dependent on the speed of rotation of the engine, and this pressure is established in the duct 34 via the outlet orifice 36.

The pressure exerted in the duct 34, is, in effect a pilot pressure controlling the position of the slide of the hydraulic distributor 25 and of the output regulation valve 39. According to the position of the slide of the distributor 25, the chamber $C_2$ is connected to the duct 20 containing fluid, under pressure or to the duct 33 which is not under pressure, as mentioned above, in cases (a) and (b). The pilot pressure in the duct 34 which terminates at the output regulation valve 39 thus making it possible to control the hydraulic receivers $E_1$, $E_2$, $F_1$ and $F_2$ as mentioned above.

In the circuit particularly described, the various valves and distributors are controlled in response to the speed of rotation of the engine, without unnecessary power loss. This enables extra pressure to be applied to the distributors when the vehicle is starting, that is to say when the torque converter acts as a multiplier of the driving torque. In this manner, the vehicle can start without any slip between the various elements of the clutch and immobilizing devices without overloading the fluid feed pump.

Further, gear changing can be effected smoothly.

The circuit can be integral with the casing of the transmission whereby the circuit can be relatively small and the use of external hydraulic ducts can be obviated.

What is claimed is:

1. In a hydraulic circuit for controlling an automatic gear box in which selection of the drive ratio is effected by selective actuation of clutch means and brake means,
   hydraulic control means associated with the clutch means and the brake means,
   an output regulation valve, said valve being connected to the control means,
   a hydraulic distributor,
   a pressure regulation valve, the hydraulic distributor and the pressure regulation valve being operative to control the output regulation valve,
   a pilot valve responsive to the value of the vacuum in the inlet manifold of an engine driving the gear box, and operative to control the pressure regulation valve,
   a reservoir for hydraulic fluid,
   pump means operative to feed fluid from the reservoir, said pump means having an outlet, the pressure regulation valve defining an outlet path from the pump outlet to the reservoir,
   duct means connecting the output path to the hydraulic distributor and to the output regulating valve, and
   a calibrated orifice located at the outlet of the regulation valve to create a pressure drop in the said outlet path such that the hydraulic distributor and the output regulating valve are controlled in response to the speed of the engine.

2. A circuit as claimed in claim 1, wherein the pressure regulation valve comprises
   means defining a first chamber, the first chamber being connected to the pilot valve,
   a slide,
   spring means, said spring means exerting a force on the slide in one direction, the pressure in the first chamber exerting a force on the slide in the said one direction and the delivery pressure of the pump means exerting a force on the slide in a direction opposite to the said one direction,
   means defining a second chamber, the second chamber communicating with the hydraulic distributor, and
   means defining a third chamber, the third chamber providing the said outlet path from the pump outlet to the reservoir, and the slide being movable within the second and third chambers.

3. A circuit as claimed in claim 2, wherein the pressure regulation valve further comprises
   means defining an outlet orifice from the third chamber, the said duct means communicating with the outlet orifice, and the pressure within the duct means being a pilot pressure, the hydraulic distributor comprising, a slide, and the output regulating valve comprising, a slide, the slide of the hydraulic distributor and the slide of the output regulating valve being subjected to the pilot pressure.

4. A circuit as claimed in claim 3, wherein the slide of the hydraulic distributor is movable into a selected one of two positions under the action of the pilot pressure, in one of the said two positions, the slide placing the second chamber at a pressure corresponding to the outlet pressure of the pump means, and in the other of the said two positions, the slide causing the second chamber to be depressurized.

* * * * *